April 21, 1953 — M. R. KARGE — 2,635,499
APPARATUS FOR TURNING SLENDER WORK
Filed Feb. 10, 1949 — 13 Sheets-Sheet 1

INVENTOR.
Maxwell R. Karge
BY Charles Shepard
his Attorney

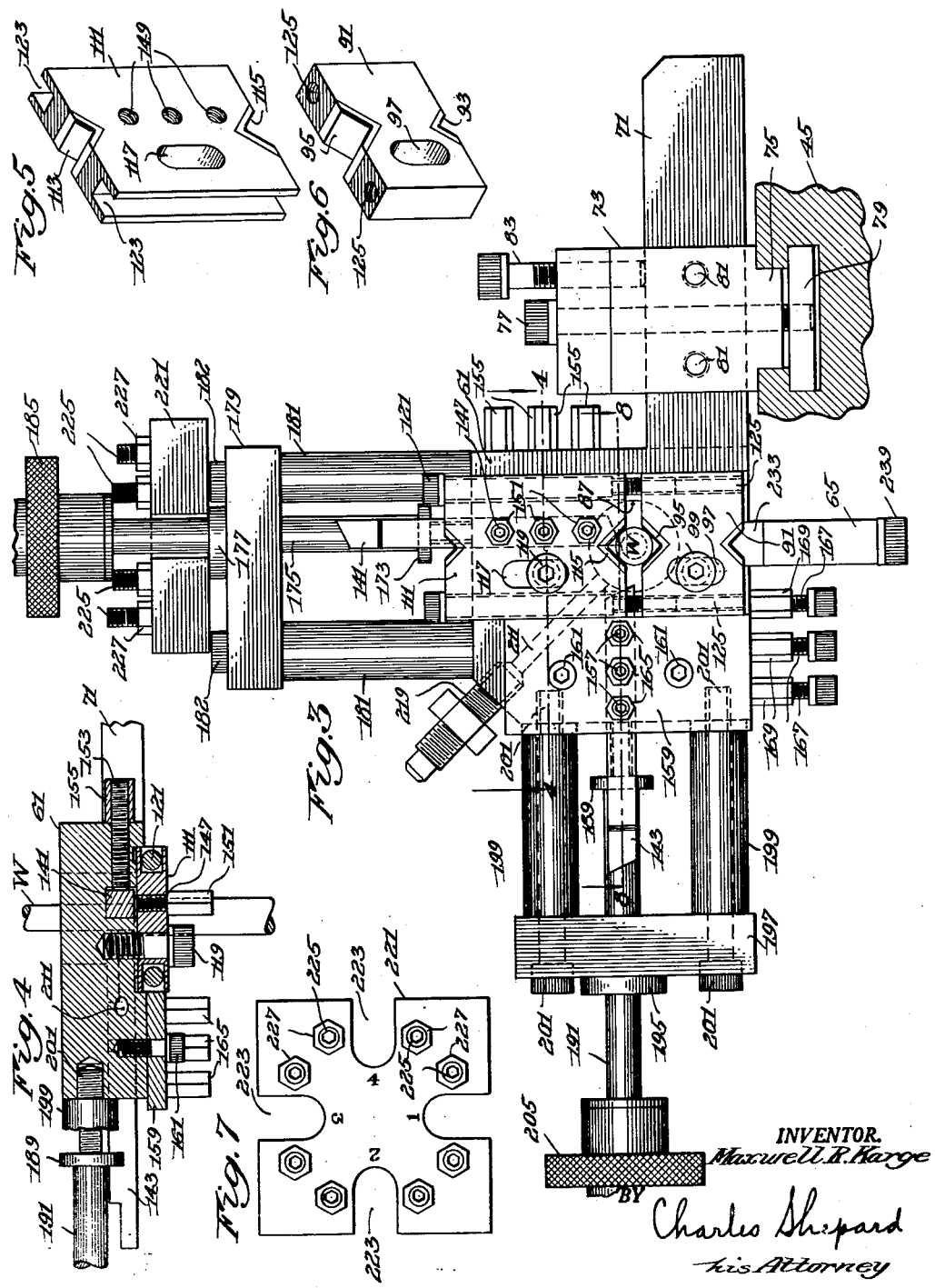

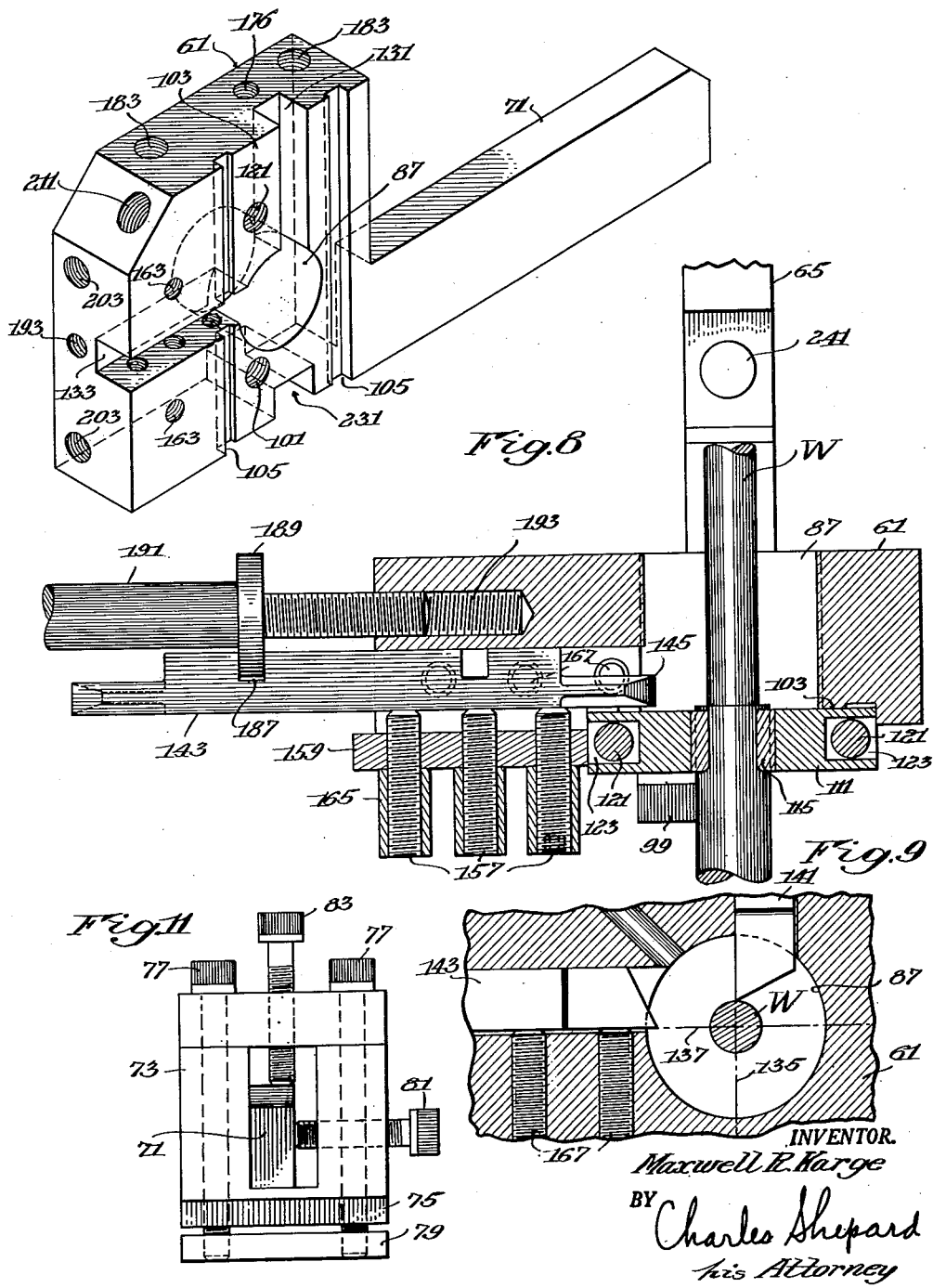

April 21, 1953 M. R. KARGE 2,635,499
APPARATUS FOR TURNING SLENDER WORK
Filed Feb. 10, 1949 13 Sheets-Sheet 4
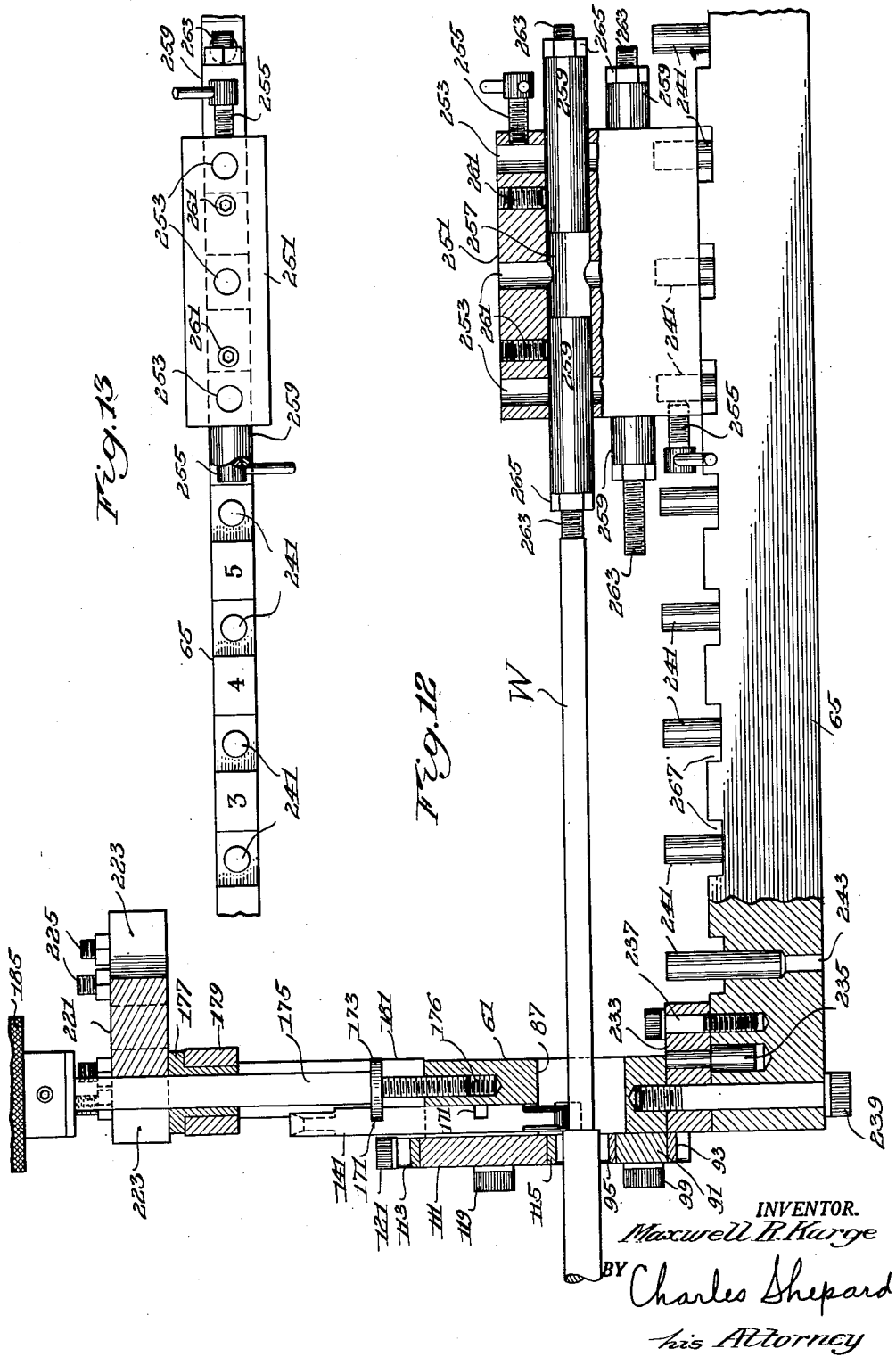
INVENTOR.
Maxwell R. Karge
BY Charles Shepard
his Attorney April 21, 1953 M. R. KARGE 2,635,499
APPARATUS FOR TURNING SLENDER WORK
Filed Feb. 10, 1949 13 Sheets-Sheet 5
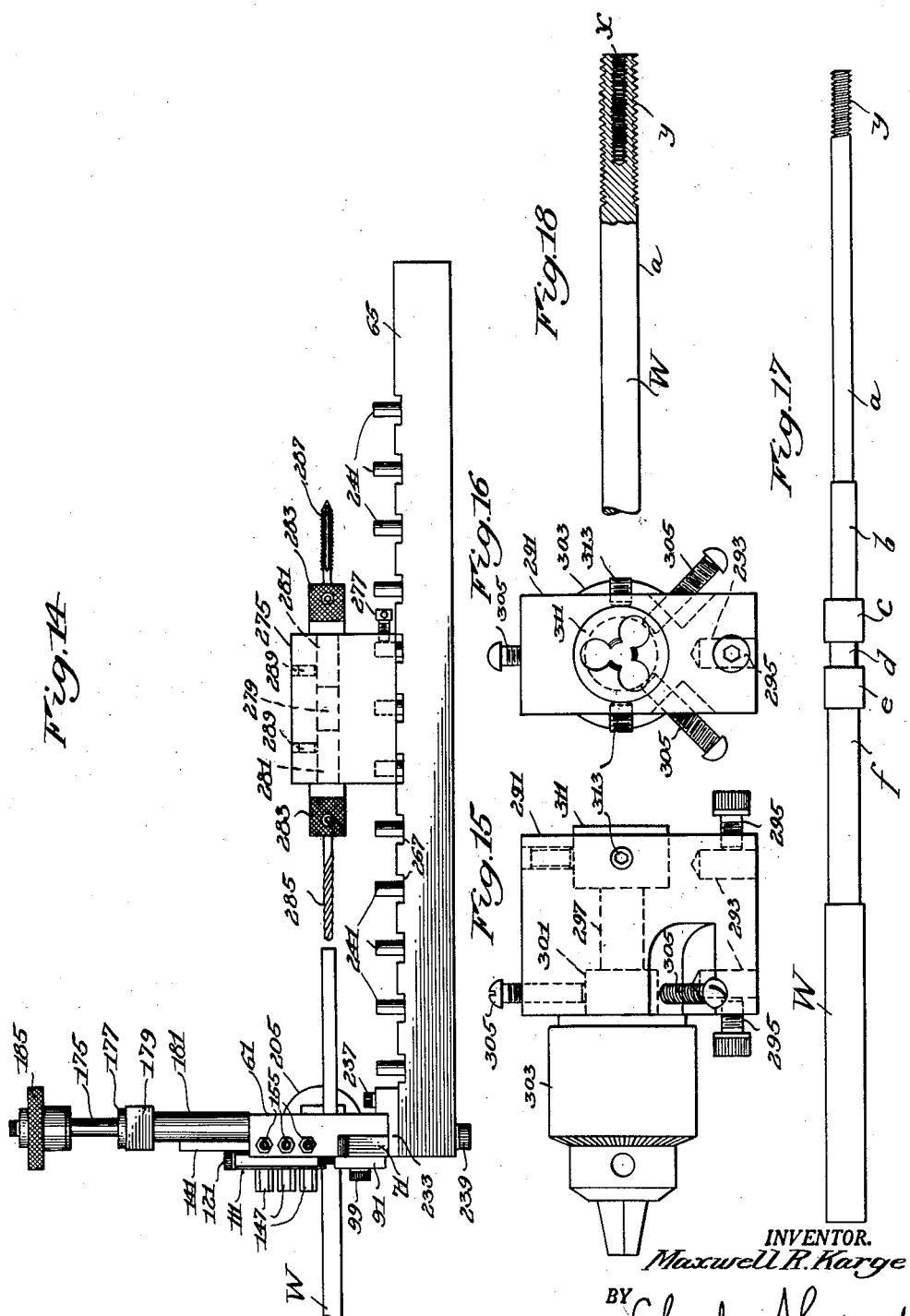
INVENTOR.
Maxwell R. Karge
BY Charles Shepard
his Attorney April 21, 1953 — M. R. KARGE — 2,635,499
APPARATUS FOR TURNING SLENDER WORK
Filed Feb. 10, 1949 — 13 Sheets-Sheet 6

INVENTOR.
Maxwell R. Karge
BY Charles Shepard
his Attorney

April 21, 1953 M. R. KARGE 2,635,499
APPARATUS FOR TURNING SLENDER WORK
Filed Feb. 10, 1949 13 Sheets-Sheet 7
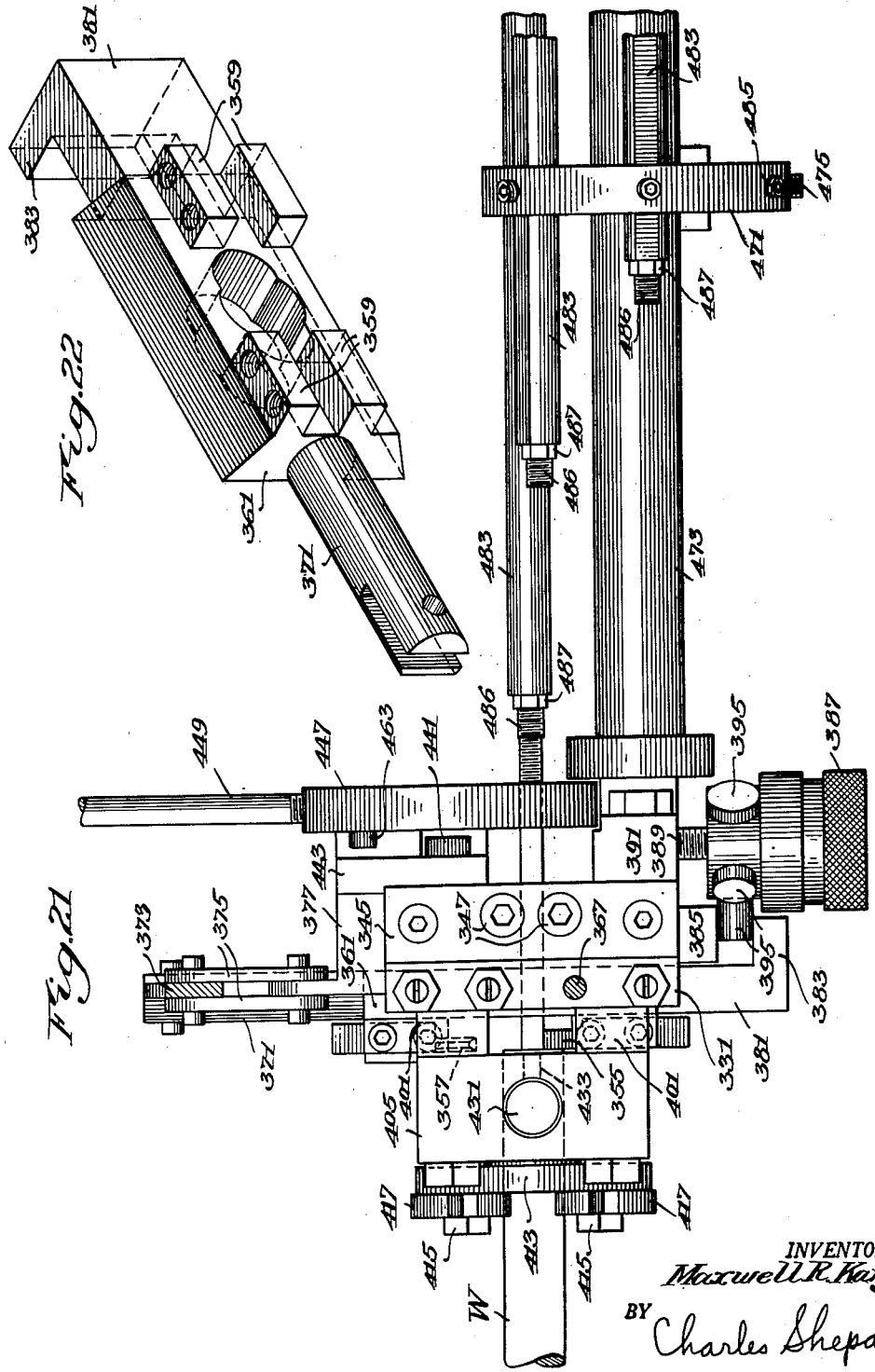
INVENTOR.
Maxwell R. Karge
BY Charles Shepard
his Attorney April 21, 1953 M. R. KARGE 2,635,499
APPARATUS FOR TURNING SLENDER WORK
Filed Feb. 10, 1949 13 Sheets-Sheet 8

INVENTOR.
Maxwell R. Karge
BY Charles Shepard
his Attorney

April 21, 1953  M. R. KARGE  2,635,499
APPARATUS FOR TURNING SLENDER WORK
Filed Feb. 10, 1949  13 Sheets-Sheet 9
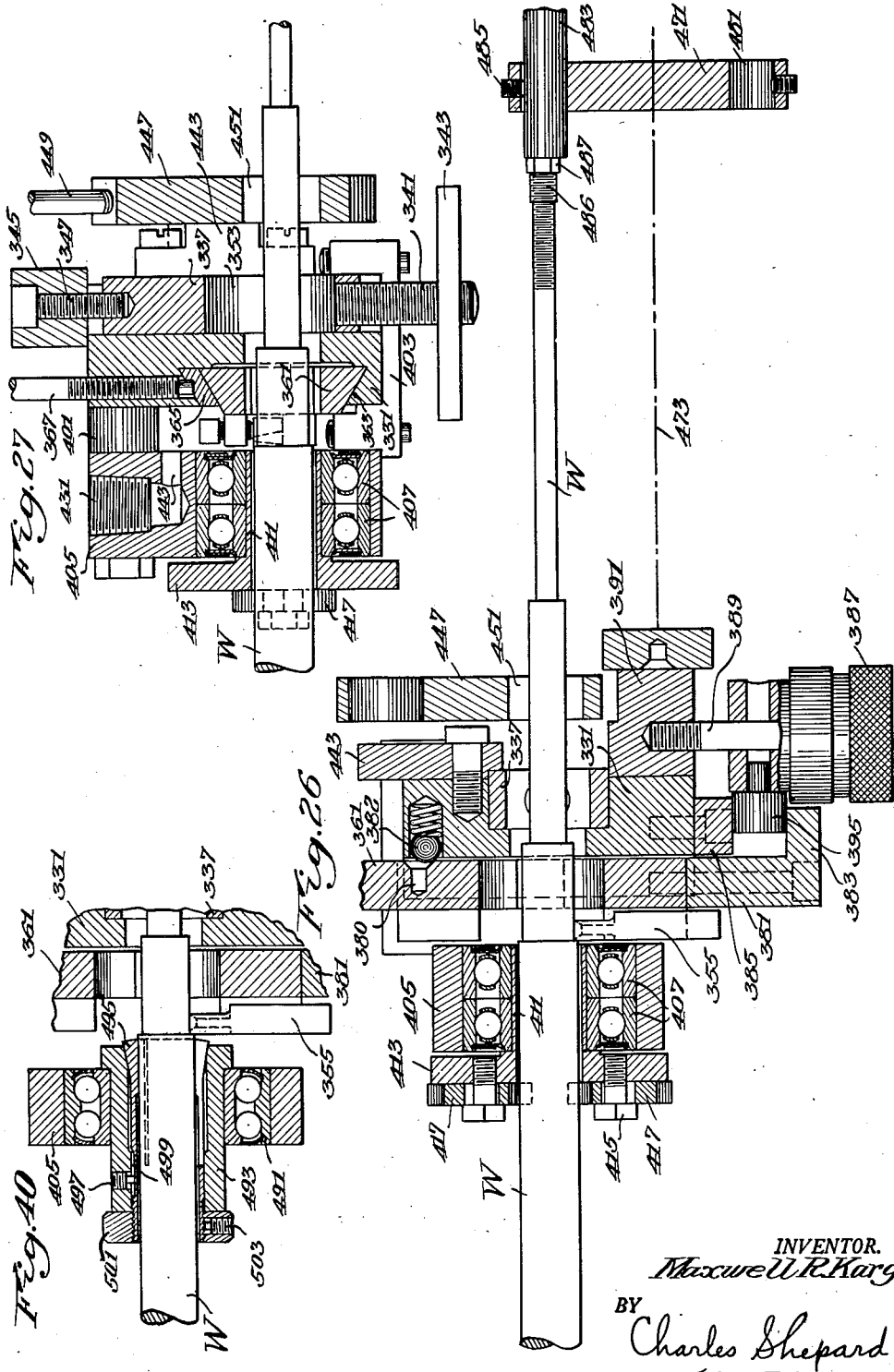
INVENTOR.
Maxwell R. Karge
BY Charles Shepard
his Attorney

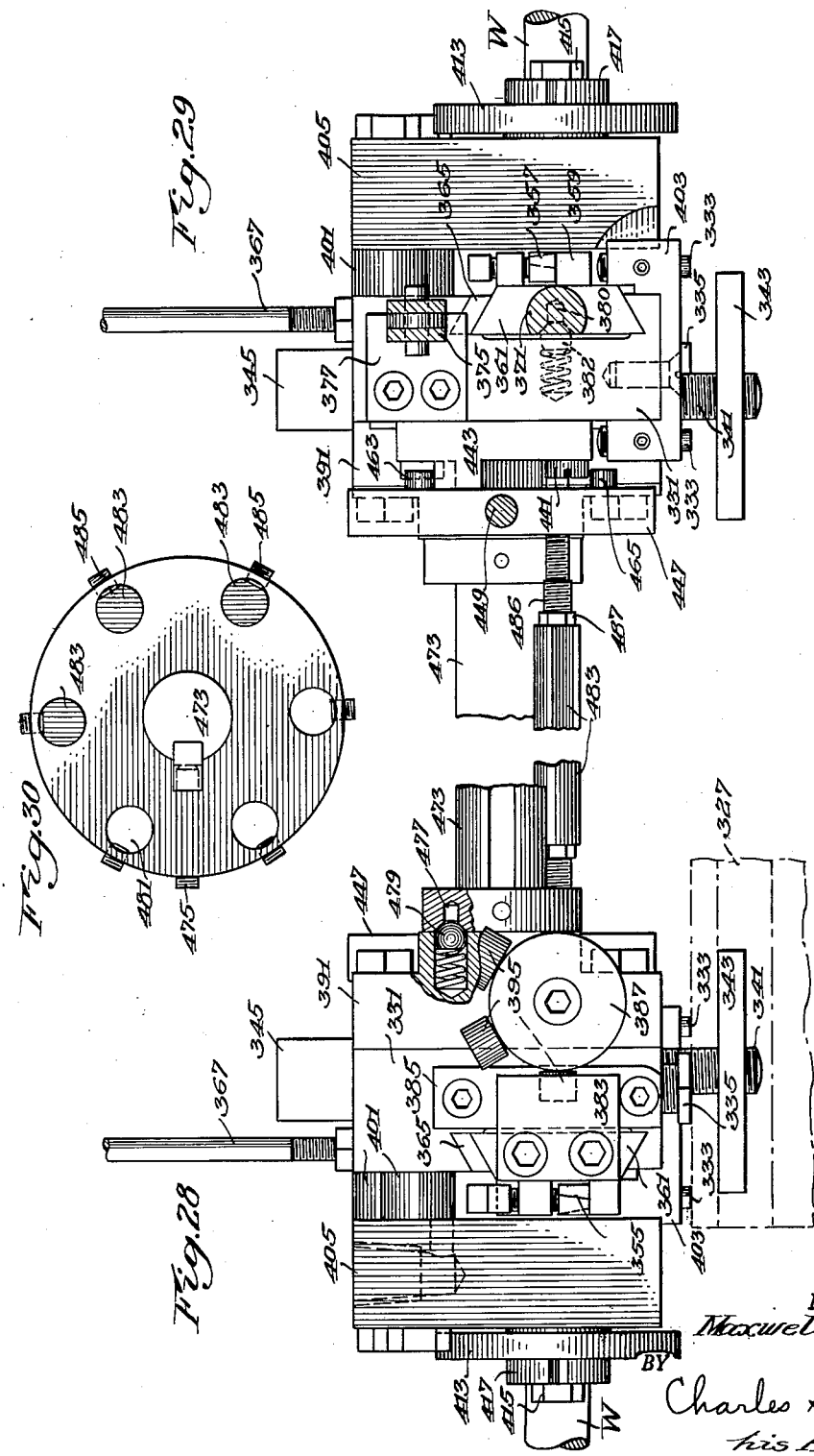

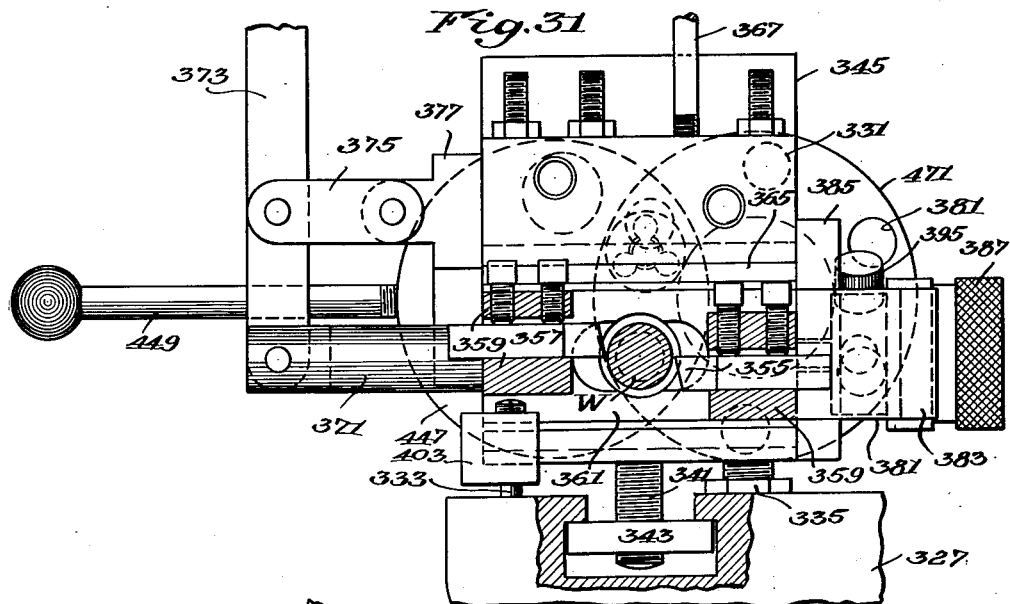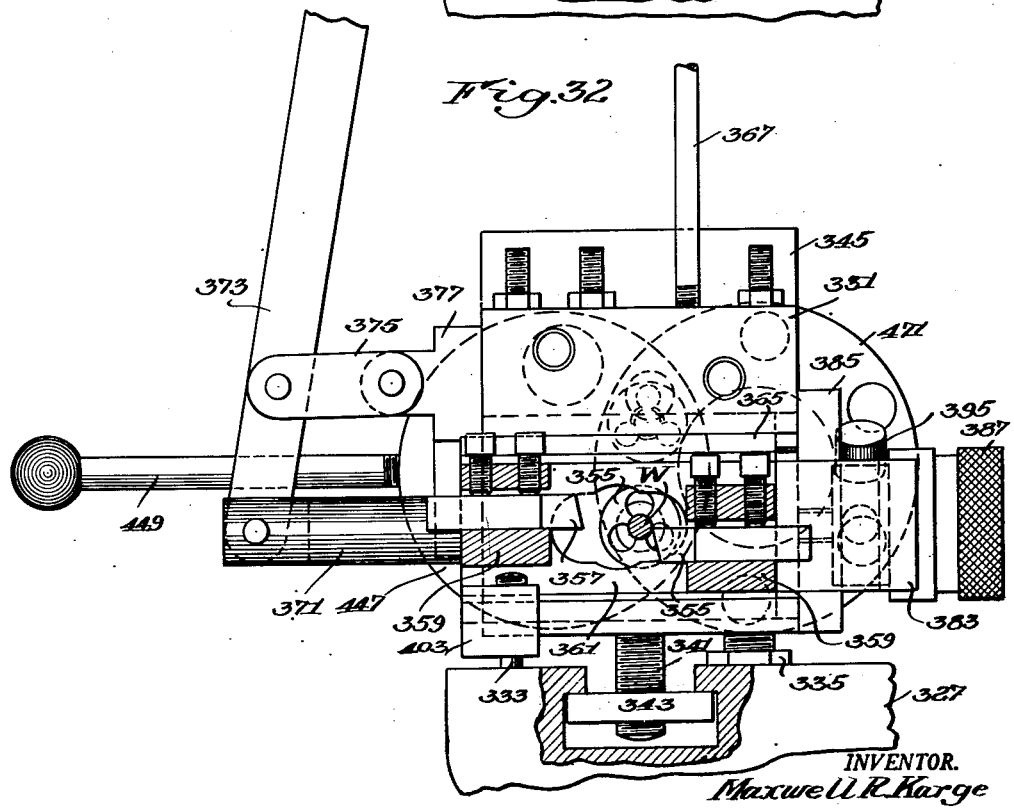

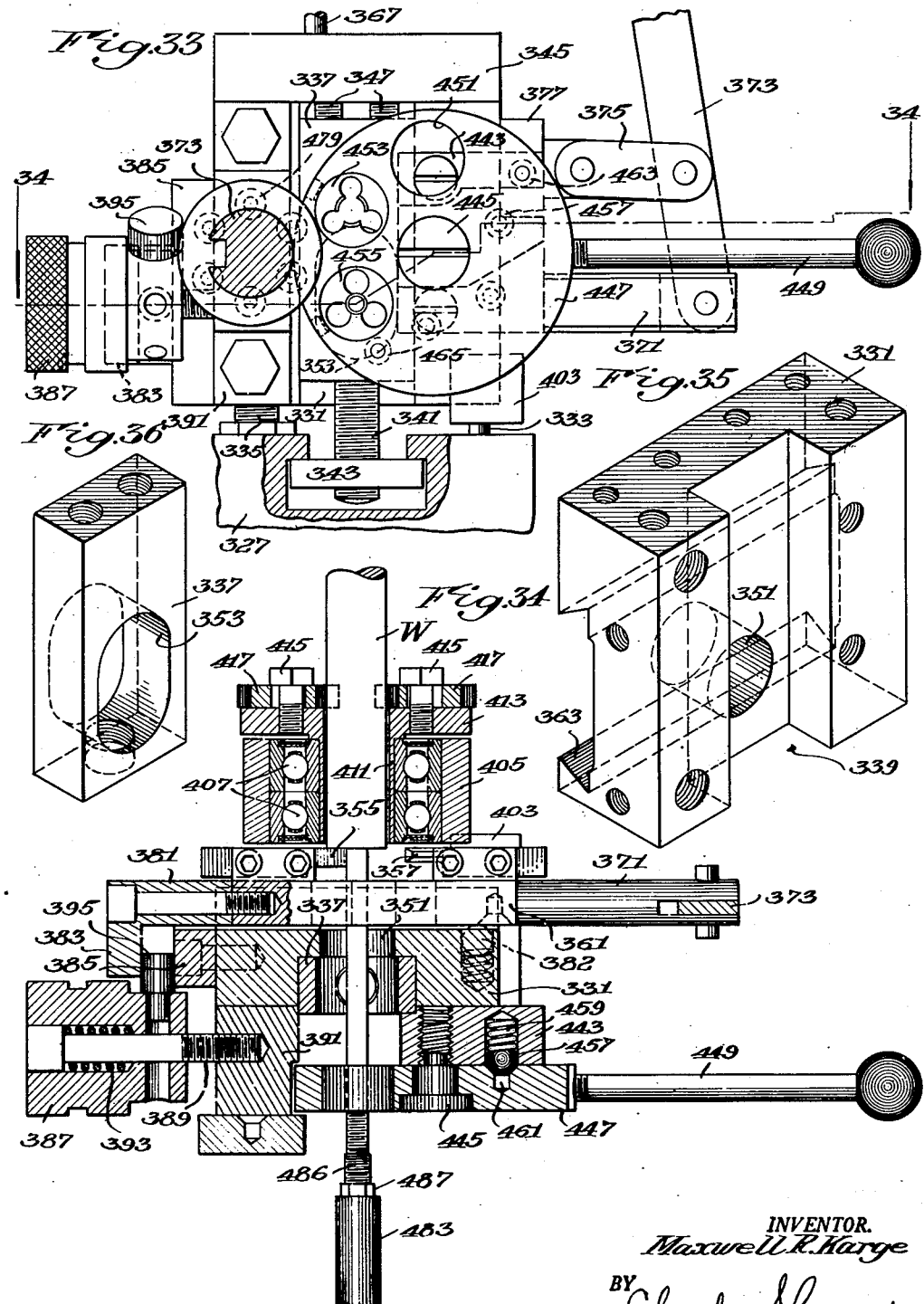

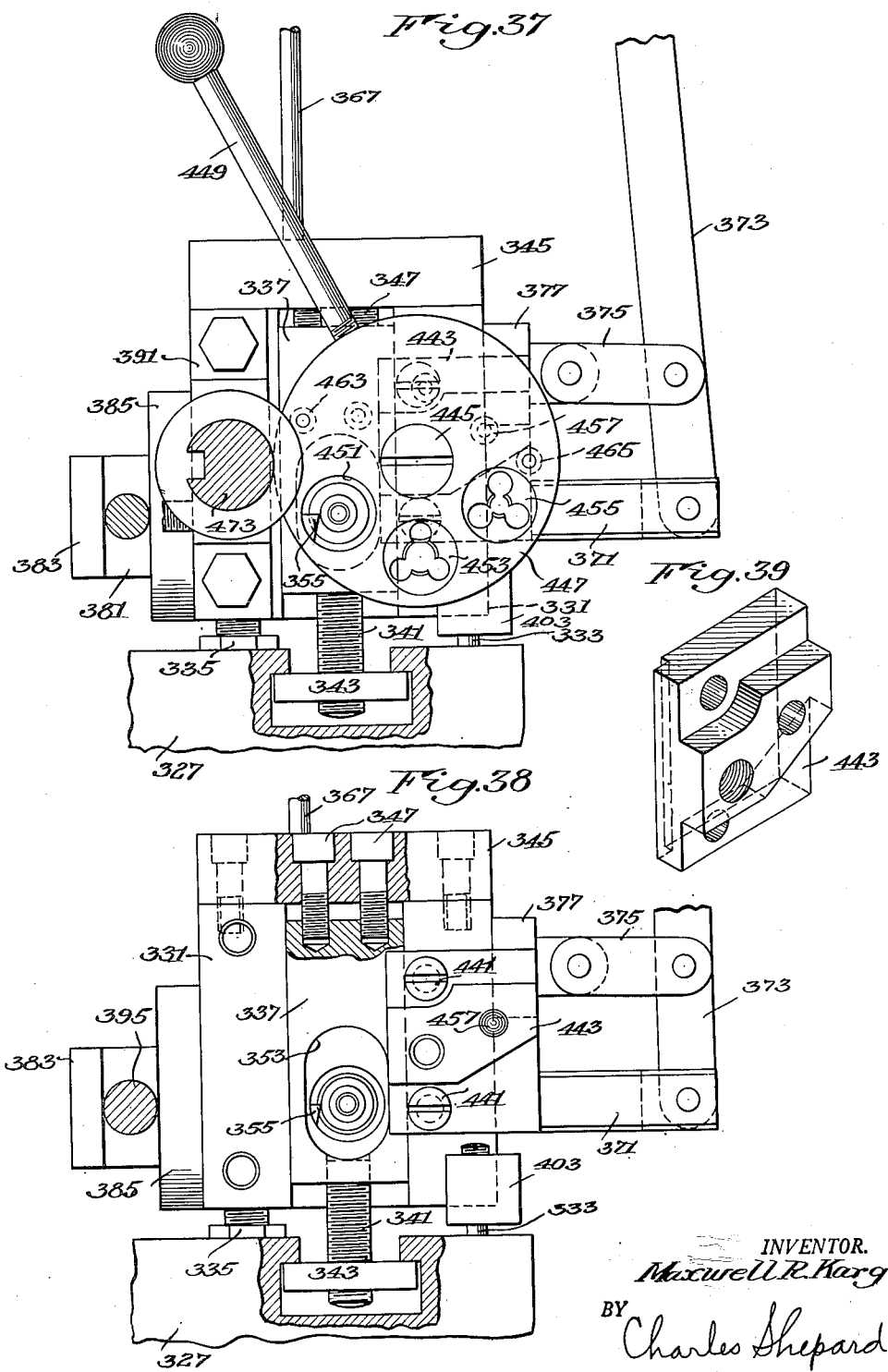

Patented Apr. 21, 1953

2,635,499

UNITED STATES PATENT OFFICE 2,635,499

APPARATUS FOR TURNING SLENDER WORK

Maxwell R. Karge, Brockport, N. Y.

Application February 10, 1949, Serial No. 75,695

3 Claims. (Cl. 82—35)

The present invention relates to a method and apparatus for turning slender work on a lathe or similar machine tool, and has for its principal object the provision of an improved method and apparatus enabling the turning of slender work with greater accuracy than is possible when following the teaching of the prior art.

Another object is the provision of an improved method and an improved apparatus for turning slender work more quickly and easily than is possible in accordance with the prior art, and at the same time maintaining closer tolerances than those previously attainable.

Still another object is the provision of improved mechanism for gauging and controlling the depth of cut in turning slender work.

A further object is the provision of improved mechanism for gauging and controlling the turning operation in an axial or longitudinal direction.

Still another object is the provision of improved mechanism for performing drilling, boring, threading, and other special operations on work being turned.

A still further object is the provision of an improved method for turning work by which the work (particularly slender work) can be finished without difficulty to a tolerance closer than any that has heretofore been considered practical.

Still another object is the provision of simpler and more compact mechanism, accomplishing the objects above mentioned, and so designed and constructed that it may be applied easily and quickly to almost any engine lathe of a conventional style or kind.

These and other desirable objects are accomplished by the construction disclosed as an illustrative embodiment of the invention in the following description and in the accompanying drawings forming a part hereof, in which:

Fig. 3 is a side elevation of the mechanism viewed from the opposite side from that shown in Fig. 2;

Fig. 4 is a horizontal section taken substantially on the line 4—4 of Fig. 3;

Fig. 5 is a perspective view of the upper V guide block forming part of the mechanism;

Fig. 6 is a perspective view of the lower V guide block;

Fig. 7 is a plan of the depth gauge block forming part of the mechanism;

Fig. 8 is a horizontal section taken substantially on the line 8—8 of Fig. 3;

Fig. 9 is a vertical section through a fragment of the mechanism, taken on a plane perpendicular to the rotary axis of the work and approximately in the plane of the cutting tools;

Fig. 10 is a perspective view of the main block of the turning mechanism with associated parts removed for the sake of clarity;

Fig. 11 is a front elevation of the parts for mounting the main block shown in Fig. 10 on the conventional tool slide of the conventional lathe;

Fig. 12 is a front elevation, with parts in vertical section, of the turning mechanism, illustrating particularly the length stop mounting bar and a length stop in position thereon;

Fig. 13 is a plan of a fragment of the length stop bar and a length stop in position thereon;

Fig. 14 is a front elevation of the mechanism illustrating a drill and tap holder mounted on the length stop bar;

Fig. 15 is a front elevation of a chuck holder and die holder adapted for mounting on the length stop bar;

Fig. 16 is an end elevation of the same;

Fig. 17 is an elevation of a typical piece of slender work such as can be readily made with the mechanism of the present invention;

Fig. 18 is a view of the right hand portion of Fig. 17 partly broken away and partly in vertical section to illustrate the fact that the mechanism of the present invention may be used for drilling and tapping or internally threading the work, as well as for externally threading it;

Fig. 21 is a plan of the modified form of apparatus, with parts broken away;

Fig. 22 is a perspective view of the tool-holding slide used in the modified form of apparatus;

Fig. 26 is a horizontal section taken substantially through the work axis of the modified form of construction;

Fig. 27 is a vertical section through the same, taken on the same axis;

Fig. 28 is a fragmentary front elevation of the modified apparatus;

Fig. 29 is a rear elevation of the same;

Fig. 30 is a face view of a turret tool holder for the modified apparatus;

Fig. 31 is a left hand side elevation of the modified apparatus, corresponding in general to Fig. 23 but with parts broken away and parts in section, illustrating the cutting tools in one position;

Fig. 32 is a similar view showing the cutting tools in a different position;

Fig. 33 is a right hand side elevation of the modified apparatus, similar in general to Fig. 20 but with parts broken away and parts removed so as to illustrate certain underlying parts;

Fig. 34 is a horizontal section taken substantially on the line 34—34 of Fig. 33;

Fig. 35 is a perspective view of the main block of this modified apparatus;

Fig. 36 is a perspective view of another block slidably mounted in the main block;

Fig. 37 is a view similar to Fig. 33, showing the parts in a different position, and with other parts broken away;

Fig. 38 is a view similar to Figs. 33 and 37 with additional parts removed and parts in section;

Fig. 39 is a perspective view of a folding block shown in elevation in Fig. 38; and Fig. 40 is a view similar to a fragment of Fig. 26, illustrating a modified construction.

The same reference numerals throughout the several views indicate the same parts.

Figure 1:
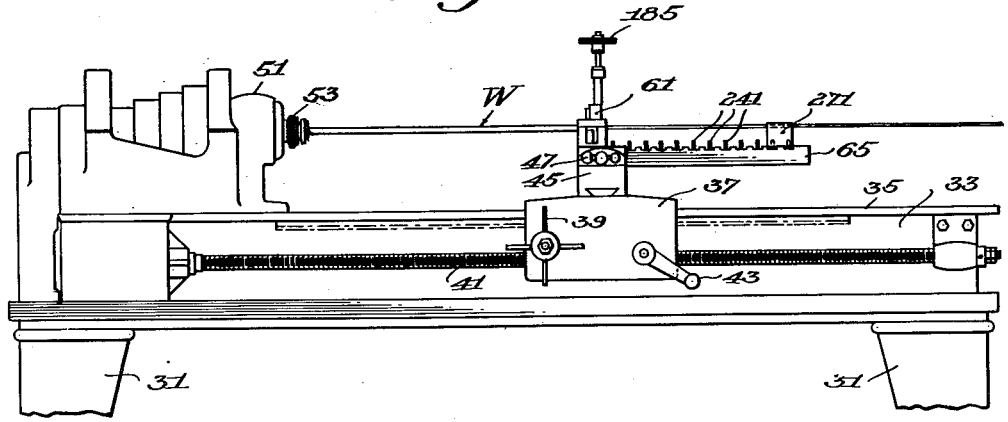
Fig. 1 is a front elevation of a fragment of an engine lathe of conventional form, with the mechanism of the present invention applied thereto.

The present application is a continuation in part of the copending United States patent application of Maxwell R. Karge, Serial No. 541,830, filed June 23, 1944, for Device for Turning Slender Work, now Patent No. 2,464,813, issued March 22, 1949. Certain subject matter disclosed but not claimed in this present application is claimed in said copending application.

The method and the apparatus of the present invention enable the turning of long slender work to various different diameters, as desired, at different locations along the length of the work, to an accuracy which can be kept within a tolerance of about 0.0005 of an inch or less, when working with diameters of the order of magnitude of about ¾ of an inch or less, throughout lengths up to even ten feet or fifteen feet. Moreover, these close tolerances can be maintained, according to the present invention, even when employing an old lathe having much looseness and chatter, because the accuracy of the work performed in accordance with the present invention is independent of the accuracy of the bed of the lathe, the accuracy of the cross slide thereof, or the accuracy of the spindle bearings.

Among the principal reasons for the great accuracy attained by the present invention, may be mentioned the following factors:

First, the work being turned rotates in a guide or bearing engaging always with the unturned or original diameter of the work, at a point immediately along side of the cutting tool. There is no appreciable opportunity for the work to spring away from the cutting tool, no matter how slender the work may be, for the cutting tool engages the work right along side of the guide or bearing in which the work rotates and which holds it against deflection.

Second (in one form of the present invention) the guide or bearing in which the work rotates (immediately along side of the cutting tool) engages the work not with a mere bearing pressure of ordinary magnitude, but with such extreme pressure that the work is, in effect, burnished and sized by the bearing as the work rotates in the bearing and concurrently moves longitudinally through the bearing. It is found that rod stock of the usual commercial kinds such as is used for turning long slender work frequently varies in diameter by as much as 0.001 inch or even more, at various points along its length. Where no special provisions are made for this commercial variation in the diameter of the rod or bar stock, inaccuracies in the finished work will inevitably result when turning long slender articles. In the present instance, however, the guide or bearing which supports the stock immediately adjacent to the cutting tool is set up so tightly, to grip the rod or bar of stock under such extreme pressure, that the stock, in effect, is smoothed down or burnished down to a uniform diameter by the pressure of the guide or bearing, as the stock turns in and moves longitudinally through the guide or bearing. Thus a different action in kind, rather than a mere difference in degree of bearing pressure, is achieved. To aid in this, the surfaces of the guide or bearing which contact with the work are preferably faced with some extremely hard and durable facing material, such as carboloy.

Third (again in one form of the invention) the work being turned, at the point where it passes through the high pressure guide or bearing, is flooded with a generous flow of lubricant or coolant at a uniform and very low temperature, preferably a refrigerated lubricant at a temperature of about 20° below zero Fahrenheit. This generous flow of refrigerated lubricant serves the two purposes, first, of lubricating the work to enable it to pass through the extreme pressure guide or bearing and to turn therein without undue heat, and second, of keeping the temperature of the metal uniform at the instant it is engaged by the cutting tool, thus eliminating variations in diameter which might otherwise be caused by thermal expansion and contraction of the work while being operated upon by the cutting tool. Moreover, the relatively low temperature to which the lubricant is refrigerated, by lowering the temperature of the work to approximately the same low point, helps to make the metal that much more dense and firm at the instant of cutting, which again increases the accuracy.

Fourth, and in another form of the invention, the bearing or support which engages the work immediately along side of the cutting tool, is a bearing which rotates with the work, thus giving a better support to the work with less frictional resistance to rotation, which factors increase the accuracy of the results.

Fifth, in a further modification of this last mentioned form of the invention, the work bearing not only turns with the work but its internal diameter is adjustable to make a perfect match with the external diameter of the work, thus eliminating any possibility of even slight lateral play between the work and its supporting bearing. The result is, in effect, as though the headstock of the lathe were moved down next to the cutting tool and were kept there throughout the cutting operation, or as though the cutting tool were moved up to the headstock and did all its cutting right next to the headstock regardless of the length of the piece being cut, an obviously impossible performance with a conventional lathe.

Sixth, a novel and improved set of stops helps to control and limit the movements of the tool toward the rotary axis of the work as well as the relative axial movements of the tool and work with relation to each other, thus promoting the accuracy of the work both diametrically and axially or longitudinally.

A first form of the invention, illustrated in Figs. 1–18, will now be described.

Figure 2:
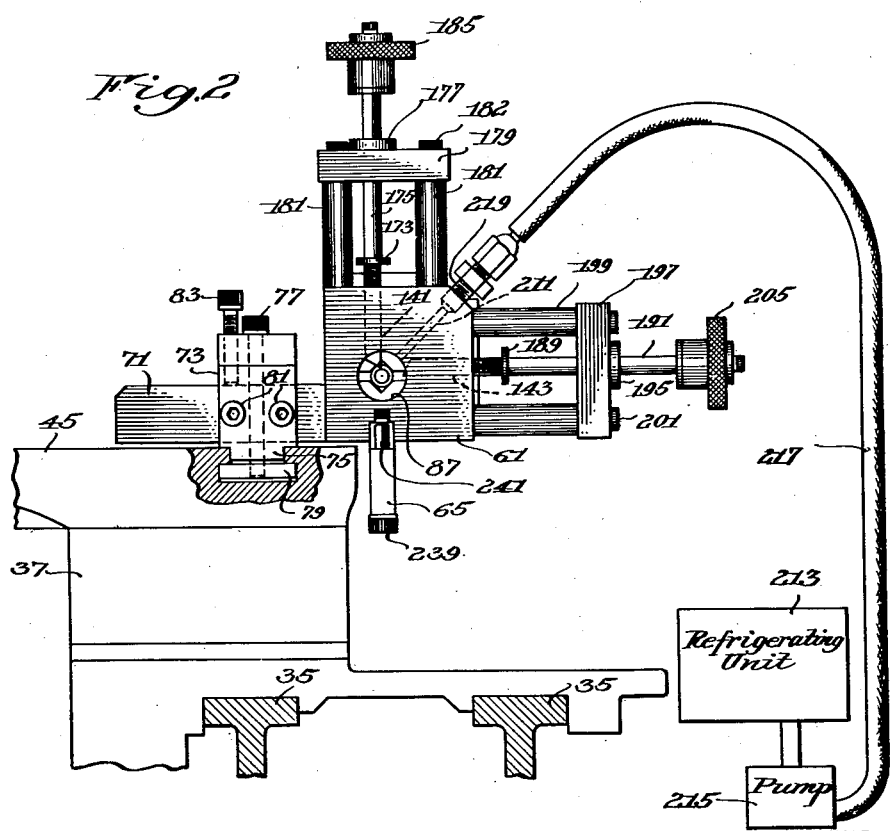
Fig. 2 is a side elevation of the principal parts of the mechanism of the present invention, with a fragment of the lathe shown partly in vertical section.
Figure 19:
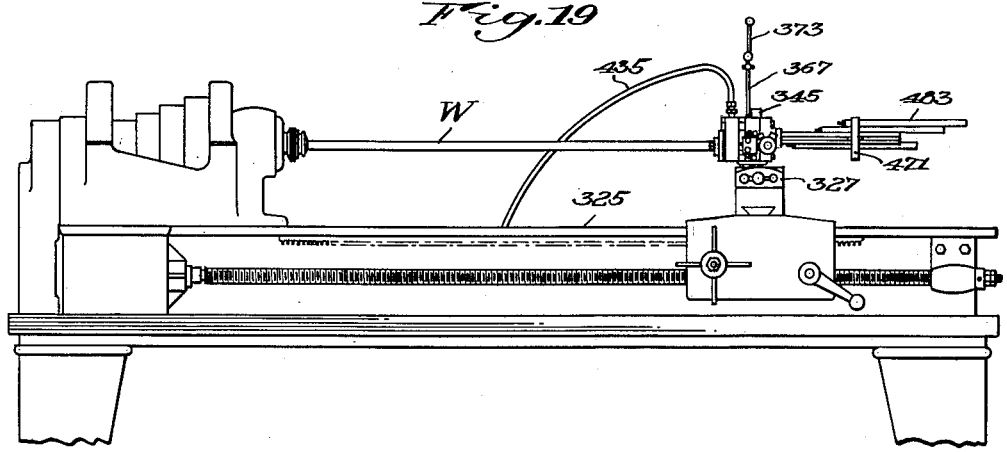
Fig. 19 is a front elevation of a portion of a lathe with a modified form of the apparatus of the present invention applied thereto.
Figure 20:
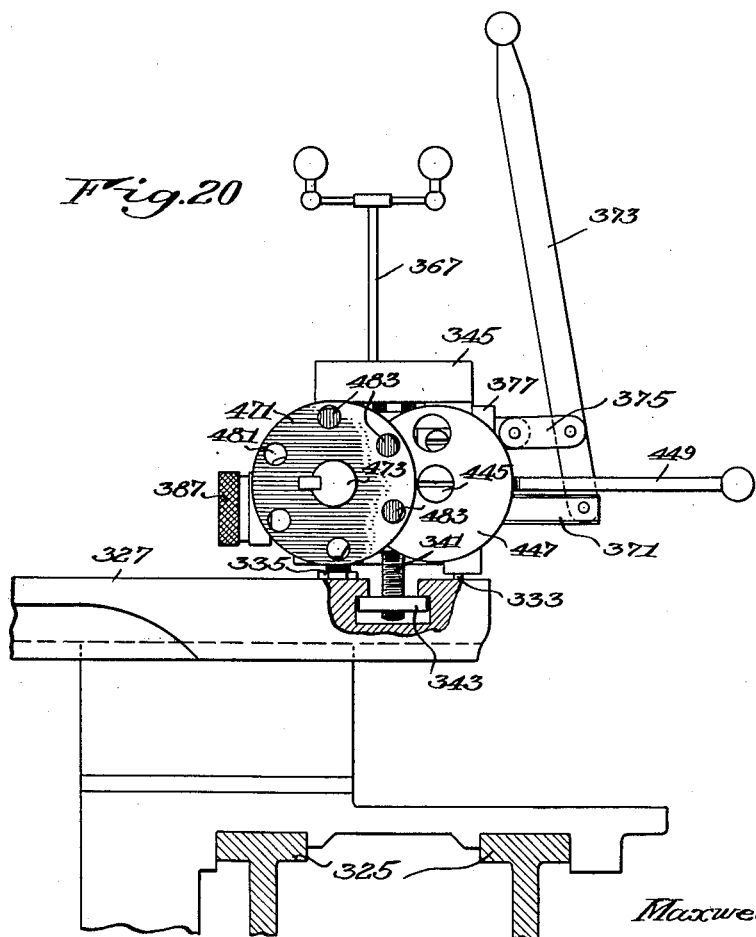
Fig. 20 is an end elevation of the same, viewed from the right hand end of Fig. 19, with parts broken away and parts in section.

Referring now to Figs. 1 and 2 of the drawings, there is shown a fragment of any conventional engine lathe having legs 31 supporting a main frame 33 provided with rails 35 forming a bed or guideway for movement of a carriage 37 which, as usual, may be moved along the guideway either by manual rotation of the handwheel 39 or by the conventional automatic or power feed. The usual lead screw is shown at 41, and the usual control lever 43 controls the engagement of the conventional mechanism on the carriage 37 with the lead screw 41 to feed the carriage for screw cutting operations when desired. Other control levers and parts of conventional construction are not here illustrated.

On the carriage 37 is mounted the conventional cross slide or tool slide 45 which may be fed crosswise to the bed of the lathe by turning the hand crank 47. The cross slide frequently is provided, in conventional lathes, with a compound rest or compound slide, which in turn supports the tool post, but there is no need for employing the compound rest for supporting the mechanism of the present invention, and so it is more convenient to omit it.

The conventional lathe includes a suitable headstock indicated in general by the numeral 51, which headstock includes the usual mechanism for rotating the lathe spindle 53, which is hollow so that collets may be mounted therein for holding the work to be turned. All of the above mentioned parts of the lathe may be of any known or conventional construction, the specific construction being unimportant so far as the present invention is concerned.

The mechanism of the present invention is conveniently mounted on the cross slide 45 above mentioned. It comprises, in general, a main block 61 (Figs. 2, 3, and 10) having an opening through which the work passes, on which main block is mounted the guiding means or bearing means for tightly gripping the work, and one or more cutting tools alongside the guiding means for acting upon the work immediately adjacent the point where it is held by the guiding means. The main block preferably also carries what may be termed a length stop bar 65 (Figs. 1, 12, 13, and 14) extending in a general direction parallel to the axis of the work, on which length stop bar there may be removably mounted suitable length stops, taps, dies, drills, chucks, and other special mechanisms or tools.

The main block 61 is conveniently mounted on the cross slide 45 by means of a forwardly extending bar portion 71 formed integrally with the main block 61 and held in an adapter 73 (Figs. 2, 3, and 11) which is mounted in the usual T-slot or undercut slot of the cross slide 45. This adapter is conveniently formed of a hollow rectangular frame of sturdy metal, having a reduced lower portion 75 fitting snugly in the narrow upper part of the T-slot, as seen in Fig. 3, and having long screws 77 passing downwardly through the adapter 73 and threaded into a plate 79 fitting in the wider lower part of the T-slot. Tightening the screws 77 tends to draw the plate 79 upwardly and thus clamps the adapter firmly to the cross slide 45 of the lathe. The extension 71 of the main block 61 extends through the adapter and is held in proper position therein by a pair of clamping screws 81 firmly tightened against one side of the extension 71, and a clamping screw 83 firmly tightened against the top of the extension 71.

The main block 61 lies, in general, approximately perpendicular to the axis of the work W, and has an opening 87 extending through the block, through which the work W may pass, the opening being conveniently circular, and of slightly larger diameter than the maximum diameter of the work which is to be turned. Since the mechanism of the present invention is intended primarily for turning rather slender work, the opening 87 usually need not be larger than about 1½ inches or 2 inches in diameter, and frequently may be smaller than this if desired. The block is so adjusted that the opening 87 has its center substantially alined with the axis of rotation of the lathe spindle 53, although absolute accuracy in this alinement is not detrimental and, within reasonable limits, is not a limiting factor in the accuracy of the work produced.

Mounted on that face of the main block 61 which is toward the headstock are a pair of V-blocks which constitute the guides or bearings for the work being turned. Each V-block is reversable and has a relatively small V notch at one end and a somewhat larger V notch at the other end, for use with work of larger diameter. The lower V block is indicated at 91 and has a relatively small V notch 93 at one end and a larger V notch 95 at the other end, both lined or faced with carboloy or other suitable extremely hard material. The block also has a vertical slot 97 through which a locking stud 99 may pass, the stud being threaded into the tapped opening 101 (Fig. 10) of the main block 61. The opposite side faces of the block 91 are parallel to each other and either one of these faces (depending upon whether the small notch or the large notch is to be uppermost) lies against the flat surface 103 of the block 61, which surface is depressed or recessed from the plane of the face of the rest of the block 61 so as to provide lateral shoulders 105 (Fig. 10) embracing the edges of the V-block 91 to hold it against lateral movement when viewed as in Fig. 3, while permitting it to be adjusted vertically when the clamping stud 99 is loose.

The upper V-block is indicated at 111 in Figs. 3 and 5 and is of the same lateral width as the lower block 91, so as to fit snugly between the same lateral shoulders 105 and to lie against the same surface 103, but this upper block is conveniently of somewhat greater height than the lower block, as may be seen from Figs. 3, 5, and 6. Like the lower block, the upper block 111 also as a small V notch 113 and a larger V notch 115, at opposite ends, both lined or faced with carboloy or other hard, tough material. It also has a vertical slot 117 through which extends a locking stud 119 screwed into the tapped opening 121 (Fig. 10) of the main block 61. When the two locking studs 99 and 119 are loose, both of the V-blocks or guide blocks 91 and 111 may be shifted upwardly or downwardly along the flat face 103 of the block 61 to bring the notches of the blocks into proper contact with the particular diameter of the work to be operated upon at the moment, and when the locking studs 99 and 119 are completely unscrewed the blocks may be reversed so that the two small notches may be used for embracing work of small diameter and the two larger notches may be used on work of larger diameter.

To draw the two V-blocks tightly toward each other to grip the work with the necessary high pressure, two clamping screws 121 are provided, the heads of the screws bearing on the top surface of the upper block 111 and and the shanks of the screws extending freely along the edges of the upper block 111 in the recesses 123 (Figs. 5 and 8) and being threaded into tapped openings 125 (Figs. 3 and 6) in the lower guide block 91.

The main block 61 carries at least one cutting tool, and may carry two or more cutting tools if desired, all of the tools being designed to operate upon the work immediately adjacent to the location where it is held and supported by the V guide blocks 91 and 111. Two cutting tools are illustrated by way of example in the present drawings, one being mounted in the vertical channel 131 formed in the face of the main block 61, the other being mounted in the horizontal channel 133 likewise formed in the face of the block 61. These tool channels extend approximately radially with respect to the work-receiving opening 87 and the work W itself, but are offset slightly from a true radius so that the effective working edge or cutting edge of the tool will lie on a true radius and travel along a true radius when the cutting tool is fed toward or away from the axis of the work, as may be more clearly seen from Fig. 9, in which the lines 135 and 137, respectively, denote the diametrical lines constituting the paths of travel of the cutting ends of the tools 141 and 143 mounted respectively in the tool guiding channels 131 and 133. The cutting tools have square or rectangular shanks having approximately the same cross sectional dimensions as the guiding channels 131 and 133, and if the cutting edge of the tool is not of the full width of the tool, then such cutting edge is formed so as to lie at that side of the tool shank closest to the V guide block 91 and 111, as is indicated at the cutting edge 145 in Fig. 8.

Each of the cutting tools is held against lateral play in its guiding channel by means of adjustable gibs conveniently in the forms of adjusting screws with flat ends which form gibs. For example, the tool 141 in the channel 131 is held snugly in one direction by the three gib screws 147 (Figs. 3 and 4) screwed through tapped openings 149 (Fig. 5) in the upper V guide block 11, each screw having a lock nut 151 thereon. In the other direction at right angles thereto, the tool shank 141 is held snugly by the three gib screws 153 threaded through tapped openings in the main block 61, and each provided with a lock nut 155. The other tool bit or shank 143 is similarly held snugly in its channel by the three gib screws 157 (Fig. 8) threaded through tapped openings in the plate 159 (Figs. 3 and 8) which lies against the face of the main block 61 and is held thereto by screws 161 (Figs. 3 and 4) threaded into the tapped openings 163 (Fig. 10) in the main block 61. These screws 157, like the other gib screws previously mentioned, are provided with lock nuts 165 (Figs. 3, 4, and 8) for holding them tightly after they have been adjusted. These gib screws hold the tool bit snugly in its channel in a direction parallel to the axis of the work, while other gib screws 167 (Figs. 3 and 9) come up from the bottom through tapped openings in the main block 61 and engage the lower surface of the tool bit 143 to hold it snugly in a direction circumferentially of the work. These gib screws 167 likewise have lock nuts 169 (Fig. 3) on them.

For feeding the tool bits longitudinally toward or away from the axis of rotation of the work, to control the depth of cut, each tool bit is provided with a notch in its shank which is engaged by a flange or collar on a feeding screw. The upper tool bit 141 has a notch 171 (Fig. 12) engaged by a flange or collar 173 (Figs. 3 and 12) fixed to the feeding screw 175 the lower end of which is threaded into a tapped opening 176 in the main block 61, as seen in Fig. 12, and the upper part of which is rotatably guided in a bushing 177 having a press fit in the cross bar 179 (Figs. 3 and 12) rigidly supported from the block 61 by the heavy posts 181, through which pass holding screws 182 which are screwed into tapped openings 183 (Fig. 10) in the top of the block 61. The feeding screw 175 may be turned by an accessible handwheel or knob 185. As the screw rotates, it moves axially, thus imparting feeding movement to the tool bit 141. If the tool bit is a double ended bit, as is preferably the case and as is shown in Fig. 12, two notches are provided in the shank of the bit, one to be engaged by the flange 173 when one end of the bit is in cutting position and the other notch to be engaged by the flange 173 when the tool bit is reversed end for end so that the other cutting edge cooperates with the work.

The feeding of the other tool bit 143 on the rear side of the mechanism is similarly controlled. This tool bit has a notch 187 (or preferably two notches, if the tool bit is of the preferred double ended construction) as shown in Fig. 8, the notch being engaged by the flange or collar 189 fixed to the feeding screw 191 the end of which is threaded into the tapped opening 193 (Figs. 8 and 10) in the block 61. The screw 191 is rotatably guided by the bushing 195 pressed into the cross bar 197 rigidly supported from the main block 61 by the posts 199 and the screws 201 which pass through these posts and are threaded into the tapped openings 203 (Fig. 10) in the block 61. A knob or handwheel 205 mounted on the screw 191 enables the screw to be turned readily to feed the tool bit.

The main block 61 is provided with an oblique duct 211 (Figs. 2 and 10) leading from the upper rear corner of the block downwardly and forwardly to the opening 87 through which the work extends. Refrigerated coolant and lubricant from the refrigerator indicated diagrammatically at 213 (Fig. 2) is pumped by the pump 215 through the hose 217 to the nipple 219 threaded into the duct 211 so that the lubricant and coolant flows through the duct 211 and floods the work in the immediate vicinity of the cutting tools and the guiding blocks 91 and 111. The particular lubricant and coolant employed is preferably a mixture of a non-congealing low temperature lubricating oil (such as high altitude airplane engine lubricating oil) mixed with cutting oil, and it is refrigerated in the refrigerator 213 to a temperature of approximately 15° to 20° below zero Fahrenheit.

The invention includes gauge means or stop means for controlling the depth of cut taken by the cutting tools, as well as gauge means or stop means for controlling the length of cut in a direction axially of the work. Referring first to the depth gauge means, this comprises, in its preferred form, a block 221 (Figs. 3 and 7) preferably of polygonal form (a square form being here shown as a convenient example) each side of the polygon having a notch 223 of a width slightly greater than the diameter of the shank of the tool feeding screws 175 and 191. Associated with each notch 223 is a pair of adjustable screws 225, one on each side of the notch, and each having a locking nut 227. The notches are preferably numbered or otherwise marked so they can be readily distinguished from each other, as seen in Fig. 7. In use, the gauge block is pressed with one notch thereof around the shank of the tool feeding screw 175 or 191, as the case may be, with one surface of the block resting on the bushing 177 (or 195) in which position the two screws 225 at opposite sides of the notch will be in position to form abutments underlying the hub of the knob 185 (or 205). The screws 225 associated with one of the notches of the gauge block 221 are set to the proper setting for a given depth of cut required for a certain part of the work to be done, while the screws 225 associated with another of the notches are set for determining the depth of cut required on another part of the work. When these screws have once been set, it is an easy matter to duplicate the exact diameter required on various parts of piece after piece of the work, when performing repetitive operations in producing a quantity of duplicate articles.

For example, if the work W (Fig. 17) is to be a portion $a$ of one diameter at one end of the work, followed by a portion $b$ of larger diameter, another portion $c$ of still larger diameter, another portion $d$ of smaller diameter a portion $e$ of larger diameter, and a portion $f$ of smaller diameter, and if a number of identical pieces of this construction are to be manufactured so that it is worthwhile to set the stop screws on the gauge block 221 then it is an easy matter, in taking the initial cut for the diameter of the part $a$, to place the first notch of the gauge block around the shank of the feeding screw of whichever tool bit is to be used for this first cut, and turn the knob (185 or 205) until the hub of this knob comes into contact with the feeding screws so that the feeding screw can turn no farther. Then the cut is made throughout the proper axial length of the work (the length being determined by a length stop or gauge described hereafter) and, upon completing this cut of the required length, the feeding knob is turned in a reverse direction to back the tool off from the work, and then a different notch of the gauge block is placed on the shank of the feeding screw, and the knob is turned to feed the tool into the work to the extent permitted by the setting of the stop screws 225 associated with this second notch of the gauge block, thus producing the proper diameter for the portion $b$ of the work. Similarly other notches of the same gauge block or different blocks are used to determine the proper positions of the cutting tools for successive portions $c$, $d$, $e$, and $f$ of different diameters.

The length stop or length gauge mechanism is best understood by reference to Figs. 12 and 13. As already mentioned, there is a length stop bar 65 extending parallel to the rotary axis of the work and supported from the main block 61. The bottom of the main block has a notch or channel 231 (Fig. 10) extending parallel to the axis of the work, and in this notch there sets tightly a spacer block 233 held rigidly by a pin 235 and a screw 237 to the length stop bar 65, the length stop bar and spacer block 233 together being rigidly secured in the notch 231 by the screw 239.

Projecting upwardly from the upper face of the length stop bar 65, throughout substantially its entire length, are pins 241, arranged at uniform spacing from each other, such for example as a center to center spacing of one inch. These pins are hardened, and are pressed tightly into the upper portions of counterbored holes in the bar 65, the lower portions of such holes being open as indicated at 243 and serving to receive a drift pin if it is necessary to drive one of the pins 241 out of the bar for replacement. This bar 65 is of considerable length, preferably somewhat longer than the length of the work which is ordinarily to be turned on this apparatus, although the length of the bar 65 is not a limiting factor in the length of the work to be turned, and work longer than the bar 65 can be turned if desired, although in that case some of the advantages of the present invention cannot be fully utilized.

One or more length stop blocks are provided for mounting on the pins 241 of the length stop bar 65, to contact with the end of the work for gauging the same in an axial direction. Each length stop block is preferably reversable end for end, and also reversable by turning it over (top for bottom) so that each block provides four different length stops. One of such blocks is indicated in Figs. 12 and 13, and comprises a rectangular block 251 of metal, having three holes 253 formed vertically therein, parallel to each other and perpendicular to the top and bottom surfaces of the block, and at the same center to center spacing from each other as the spacing of the pins 241 on the bar 65. The holes 253 are of such diameter as to make a fairly snug fit over the pins 241, and any looseness or play of the block on the pins is taken up by clamping screws 255 at the ends of the block which, when tightened, will bear against one side of one of the pins 241 and thus draw the block tightly against the opposite sides of the pins.

Two longitudinal bores 257 are provided in the block, one at the elevation of the axis of the work W when the block has one side uppermost, and the other at the elevation of the axis of the work when the block has the opposite side uppermost. In each of these bores 257 two plungers 259 are fairly snugly but slidably mounted, one projecting from each end of the bore as seen in Fig. 12, each plunger 259 being firmly held in any position in which it may be set in the bore by means of a set screw 261. Each plunger 259 is hollow, and threaded into it is a suitable screw 263 held against turning by a lock nut 265.

In order that chips or dirt around the pins 241 will not interfere with proper seating of the block 251 on the pins, the bar 65 is preferably recessed adjacent each pin, as indicated at 267 in Fig. 12. The flat top surface of the bar 65 between these recesses 267 can easily be wiped clean without bothering with small chips which may lodge around the pins 241 in the recesses 267, since such chips will not interfere with the seating of the gauge block 251 on the pins. A numeral or similar identifying mark is preferably placed adjacent each pin 241 on the bar 65, and suitable numerals or other identification marks are placed on each length stop block 251 to distinguish one block from another, and also other suitable markings to distinguish each gauge plunger 259 of the block from the other gauge plunger of the same block. This arrangement makes it easy, after the stops have been properly set, to place the right stop plunger 259 of the right gauge block 251 on the right pins 241 for gauging the length of any particular cutting operation on the work, and identical duplicates can be turned out very quickly by the use of this length stop arrangement, in each instance continuing the cutting in a direction axially of the work until the end of the work comes into contact with the end of the appropriate stop screw 263 (as seen in Fig. 12) then resetting the cutting tool for the next cut of the next diameter and continuing the axial feeding of the work until the advancing end thereof comes into contact again with the appropriate stop screw 63 of the block 251 which has meanwhile been shifted to a different position, on the same pins 241 or on different pins, as the case may be.

The same length stop bar 65 and pins 241 thereon may conveniently be used for various other purposes besides the mounting of the length stop blocks. For example, if the work to be turned is of great length, it may be advisable, when turning has progressed to a point where a considerable length of the work projects rightwardly beyond the cutting tool, to support the work on a steady rest mounted on the bar 65 near the right hand end thereof, as indicated at 271 in Fig. 1. This steady rest may be of quite simple construction, consisting merely of a metal block having appropriately spaced holes in its lower face for receiving two of the pins 241, and having near its top a bore alined with the rotary axis of the work and of sufficient diameter to receive the work with a reasonable amount of play, as readily understood from Fig. 1.

Likewise the bar 65 and pins 241 may be used for supporting a variety of special fixtures and tool holders. For example, as seen in Fig. 14, it may support a holder 275 comprising a metal block having holes in its lower face for receiving the pins 241, and a clamping screw 277 (corresponding to the clamping screws 255 previously mentioned) for bearing against the pins, and having a bore 279 alined with the axis of the work and adapted to receive the shanks 281 of special tool holders 283 for holding any desired tools axially alined with the work, such as the drill 285 mounted in the tool holder at the left of the block 275 and the tap 287 mounted in the tool holder at the right thereof. Set screws 289 (corresponding to the screws 261) serve to hold the shanks 281 of the holders 283 in the bore 279, and the tools 285 and 287 are held in the holders 283 by suitable set screws or other means. When the drill 285 is to be used to bore an axial hole in the work, the tool holder 275 is set in the position indicated in Fig. 14 with the drill 285 pointing toward the work, and the work is rotated while at the same time being advanced axially toward the drill. If the bore thus drilled is then to be tapped, the clamping screw 277 is loosened, the holder 275 is taken off of the pins 241 and replaced in a reversed direction with the tap 287 pointing toward the work W and is clamped in place again on the pins, and the work is again rotated while being advanced axially toward the tap. In speaking of axial movements of the work toward the drill or toward the tap or toward any of the other tools or stops mentioned, it is understood that relative movements are referred to, rather than absolute movements. In practice, it is usually the work which remains stationary in an axial direction (being held against axial movement by the collet or chuck on the lathe spindle 53, Fig. 1) and the mechanism of the present invention, including the main block 61, the length stop bar 65, and the stops, tool holders, or other parts mounted thereon all move as a unit leftwardly with respect to the work W, along with the carriage 37 on which all of these parts are mounted. The hose 217, being flexible, permits uninterrupted supply of refrigerated lubricant to the mechanism as the mechanism moves along the work.

Another form of special holder is shown in Figs. 15 and 16. It comprises a block 291 having a lower face provided with holes 293 of the proper size and spacing to receive two of the pins 241, and clamping screws 295 for engaging the sides of the pins in the holes 293 to clamp the block tightly to the pins. Extending through the block is a bore 297 axially alined with the work, and having a counterbore of one diameter at one end and a counterbore of larger diameter at the other end. The first counterbore is of the proper size to receive the shank of various special tools which may be mounted therein, such as the shank 301 of a universal chuck 303, which shank is held by the set screws 305 spaced at various points around the shank, preferably three in number. Any desired drill, tap, reamer, or other small tool can be mounted in the universal chuck 303 for operation upon the work. The counterbore of larger diameter at the opposite end of the bore 295 can be used for mounting any other tool or appliance of appropriate diameter; for example, for mounting the threading die 311, held therein by a pair of set screws 313 bearing on the die from opposite sides. This holder 291 can be reversed end for end on the pins 241 so that either the chuck 303 is presented toward the work, or the die 311 is in position to engage the work. If the work is to be externally threaded throughout any great length, or at any great distance from the right hand end of the work, then the set screws 305 are loosened and the chuck 303 is taken out of the holder so that the work, after passing through the threading die 311, may continue on through the bore 297 and out the other side of the holder 291.

Those skilled in the art will readily understand from the foregoing examples of holders and stops that, utilizing the same principles, holders may be made to set on the pins 241 of the bar 65, to hold any desired special tools, appliances, or implements, the particular tools here shown being illustrated merely as typical examples.

A modified form of apparatus, embodying many of the same principles in the first form of apparatus above described, but having some differences, will now be described with reference to Figs. 19 to 40, inclusive.

The modified embodiment of the invention may be used, as before, with a conventional engine lathe or similar tool, here indicated in general at 325. Mounted on any conventional cross slide or compound slide 327 of this lathe, there is a main block 331 (Figs. 33–35) supported from the slide 327 by studs and leveling screws 333 and 335. A block 337 (Fig. 36) is slidably mounted in a vertical groove or guideway 339 (Fig. 35) in the right hand face of the main block 331. This slide block 337 has an adjusting screw 341 screwed into its lower end and depending downwardly therefrom to engage a cross bar 343 in the T-slot of the tool slide 327, as seen in Fig. 33, to hold the block 337 against upward movement.

Screwed to the top of the main block 331 and extending over the top end of the groove 339, is a bar 345 having tension screws 347 extending through the bar 345 and into the upper end of the slide block 337, thus tending to pull upwardly on the block 337 and reacting with downward pressure on the main block 331 to hold it firmly seated on the supporting studs and adjusting screws 333 and 335.

The main block 331 and the slide block 337 contain horizontal apertures 351 and 353, respectively, alined with each other in the normal position of the parts through which apertures there extends horizontally the work piece W, which is usually in the form of a relatively long and slender rod having its left end held and rotated by the lathe chuck or collet or other suitable parts driven by the lathe spindle. To operate on this work piece W, there are provided cutting tools such as a forming tool 355 and a cut-off tool 357, held by suitable clamping screws between pairs of clamping lugs 359 on the left hand face of a dovetailed slide 361 (Fig. 22) which slides horizontally in a dovetailed groove or guideway 363 (Fig. 35) provided on the left face of the main block 331. When the slide 361 is moved to the rear in its dovetailed guideway 363, the forming tool 355 engages the front of the work piece W, and when the slide 361 is moved forwardly, the cut-off tool 357 engages the work from the rear.

To insure accurate guiding of the slide 361 in the guideway 363, without chatter, the guideway may be provided with an adjustable gib 365 (Fig. 27) adjusted by adjusting screws 367 extending upwardly through the main block 331 to an acceptable position at the top thereof.

For producing the forward and rearward movements of the slide 361 to bring one or the other of the tools in engagement with the work, the slide is provided with a rearward extension 371 to which is pivoted the lower end of an operating lever arm 373 (Fig. 23) which arm is pivoted at an intermediate point to a link 375 having its forward end pivoted to a suitable fixed part, such as the main block 331 or an extension 377 (Fig. 21) fixed thereto. It will be seen from Fig. 23 that when the upper end of the control lever 373 is pulled forwardly, the slide 361 is thereby moved rearwardly, so that the forward tool 355 (the forming tool) comes into contact with the work piece W. When the upper end of the control lever 373 is moved rearwardly, the slide 361 is thereby moved forwardly, so that the rear tool 357 (the cut-off tool) is brought into contact with the work. In order that the operator may, by the sense of touch or feel, know when the lever 373 is in a central position with either of the tools engaged with the work, the slide 361 is provided at one point with a depression 380 alined, when the slide is in a central position, with a spring pressed ball 382 (Fig. 26) mounted in a recess in the main block 331. For controlling the movements of the cutting tool 357 toward the rotary axis of the work piece W, the tool-carrying slide 361 is provided with a forward extension 381 having a lateral lip 383 overlapping the front edge of the main block 331. Stop pins or abutments of various sizes are adapted to be inserted between this lip 383 and the front edge of the block 331, or an anvil 385 conveniently mounted on the block. These stop pins or abutments may conveniently be removably and radially arranged on a turret knob 387 (Figs. 23, 28, and 34) rotatably and slidably mounted on a stud 389 mounted on a piece 391 fixed to the block 331. A spring 393 (Fig. 34) tends to move the turret knob 387 rearwardly on its stud 389 (which is arranged parallel to the direction of motion of the tool slide 361) until the selected one of the radial stop pins 395 on the turret knob is brought into contact with the anvil block 385. As seen in Fig. 34, the stop pin 395 thus forms a stop which contacts with the rear face of the lip 383 and limits the rearward motion of the tool slide 361. By turning the turret knob 387 to place a smaller pin 395 in the effective position, the slide 361 is allowed to travel further rearwardly, bringing the tool 355 closer to the rotary axis of the work W and thus producing a smaller diameter portion on the work at this point. Or if a larger stop pin 395 is positioned in its effective position, the slide 361 is not allowed to travel so far rearwardly, and a larger diameter part is produced on the work piece W.

Mounted on the left face of the main block 331, preferably through the intermediary of spacers 401 and 403 (Fig. 27) is a block 405 in which are mounted, in close side-by-side relation, a pair of ball bearings 407 alined with the rotary axis of the work so that the work piece W passes through the central aperture of these ball bearings immediately prior to reaching the cutting tools 355 and 357. These ball bearings form a guide to hold the work piece against lateral displacement when it is being operated upon by either of the tools 355 and 357. It will be noted from Figs. 26 and 27 that the cutting tools are immediately to the right of the right hand end of the ball bearings 407, there being substantially no space between the tools and the ball bearings, so that the ball bearings serve to support and guide the work substantially directly at the cutting point, with no appreciable chance for the work to bend or flex between the support point and the cutting point. Because of the fact that the work passes through ball bearings which rotate with the work, rather than passing through a stationary guide or support, the supporting means for the work piece produces practically no friction on the work, so far as the rotary movement thereof is concerned, and consequently deep or heavy cuts in the work can be taken with little difficulty.

When the work piece passes through the ball bearings no cuts have been taken in the work piece so it is always at its initial diameter. However, the apparatus is capable of use with work pieces of various initial diameters, and so the ball bearings have an inside diameter slightly larger than the maximum diameter of work piece intended to be used with this apparatus. To accommodate varying diameters of work pieces to the ball bearings, a series of removable and replaceable sleeves 411 are provided, each having an external diameter which is a snug fit within the central opening of the ball bearings, and an internal diameter which accommodates fairly closely the initial diameter of the work piece W. When a work piece of different diameter is to be operated upon, the sleeve 411 is removed and replaced by another sleeve having the proper internal diameter to accommodate the work piece fairly snugly.

Figure 23:
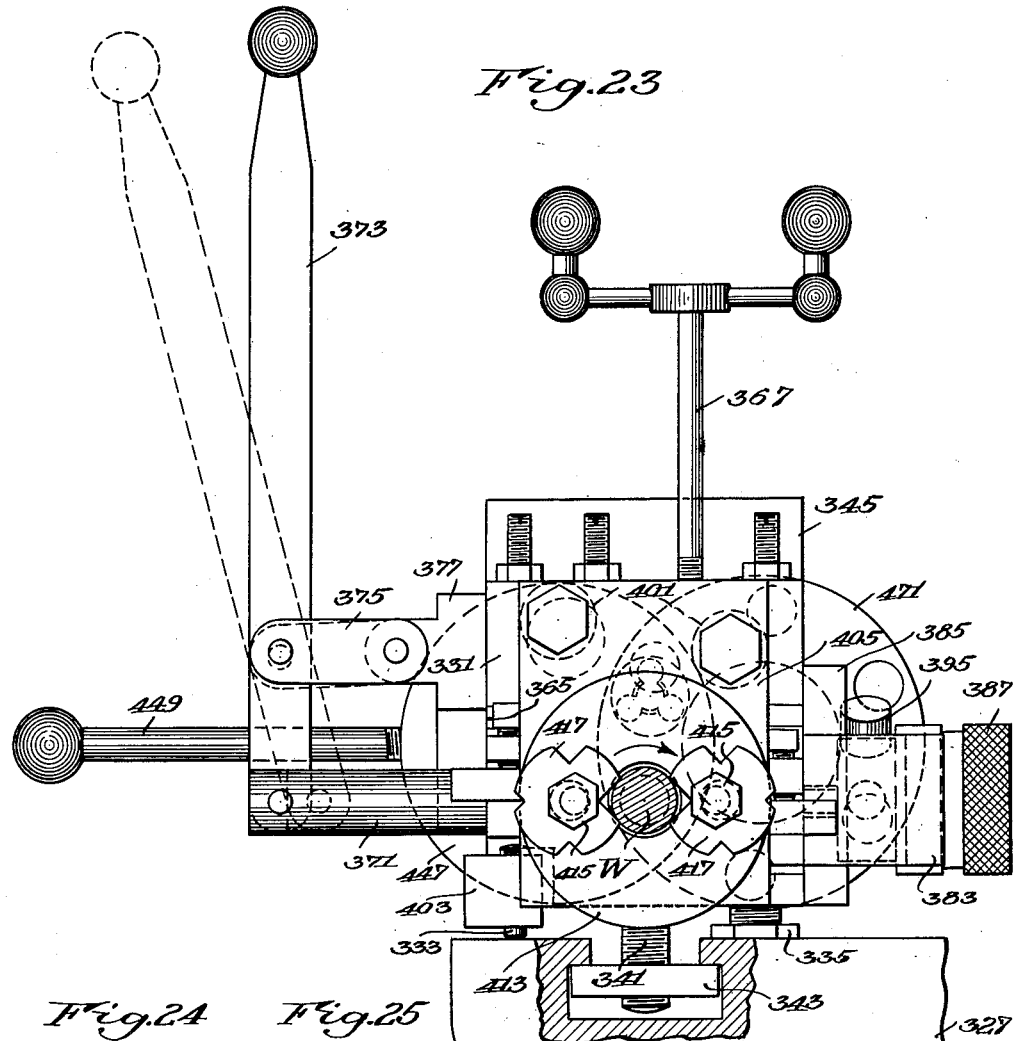
Fig. 23 is a side elevation of the modified apparatus, viewed from the left end.

The sleeve 411 preferably has at its left end a disk 413 (Figs. 23, 26, and 27) provided at two diametrically opposite points with screw studs 415 holding notched disks 417 having a series of V-shaped notches of various sizes, as seen in Fig. 23. The hole through the center of each notched disk 417, through which the stud passes, is larger than the stud as seen in Fig. 26, to permit some freedom of lateral movement of the notched disk before the stud is tightened. When setting up the apparatus for a given production run on a given diameter of work piece, notches of appropriate size in the two notched disks 417 are chosen, and are brought into engagement with opposite sides of the work piece as seen in Fig. 23, embracing the work piece snugly between the two notched disks, whereupon the studs 415 are tightened to hold the parts in this relationship. In case the diameter of the work piece W does not entirely fill the inner diameter of the sleeve 411, the notched disk serves to center the work piece in the sleeve, and also the engagement of the notched disk with the work piece creates sufficient frictional drag to insure that the sleeve 411 will rotate with the work piece, but not sufficient friction to interfere with the longitudinal feeding of the work piece.

Figures 24, 25:
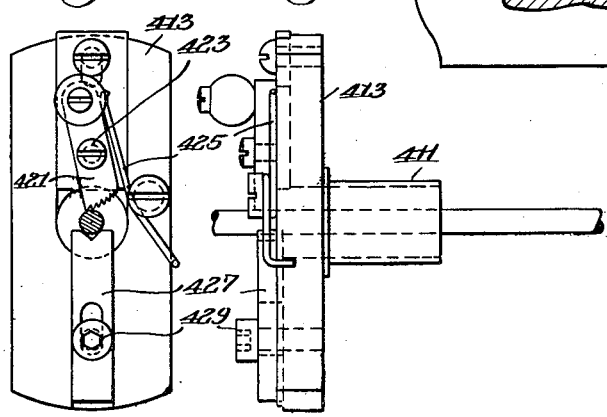
Fig. 24 is a face view of the bearing driving pawl and associated mechanism.
Fig. 25 is an edge view of the same.

In some cases, it may be preferred to use a toothed pawl to insure rotation of the sleeve 411. For example, as seen in Figs. 24 and 25, some of the sleeve 411, at least for certain diameters, may have their disks 413 provided with a toothed pawl 421, pivoted to the disk 413 at 423 and urged by a spring 425 in a direction to engage the teeth on the inner end of the pawl against the periphery of the work piece. A single notched member 427, adjustably held by a stud 429 on the disk 413, is arranged diametrically opposite the pawl 421. The teeth on the pawl provide a positive drive, insuring at all times that the sleeve 411 will turn with the work piece.

The block 405 (Fig. 27) is provided at its top with a tapped opening 431 connecting with a lateral duct 443 immediately above the work piece W. Coolant is delivered to the opening 431 by a pipe or hose 435 (Fig. 19) having at its delivery end a nipple screwed into the opening 431, and the coolant is delivered through the duct 443 onto the work piece in the immediate proximity of the cutting tools.

On the right hand face of the main block 331, near the rear corner thereof, there is secured by screws 441 a small block 443 of the shape best seen in Figs. 34, 38, and 39. Pivoted on a stud 445 (Fig. 34) screwed into the block 443, is a turret disk 447 rotatable on the stud in a plane perpendicular to the rotary axis of the work piece. This turret disk 447 is provided with a convenient operating handle 449 for moving it to various positions, and is also provided with a series of apertures which may be selectively brought into alinement with the axis of the work piece, by swinging the handle 449. One of the apertures 451 (Fig. 37) is of sufficient diameter to permit the work piece to pass through, if no operation on the work piece is to be performed by any special tool in this turret disk 447. Other apertures in the turret disk are provided with various special tools, such as the threading die 453 of one diameter, and another threading die 455 of a different diameter. By bringing one or the other threading die into alinement with the axis of the work piece and then feeding the work piece longitudinally into the threading die, suitable threads may be formed on the work piece. The threading dies 453 and 455 are mentioned merely as convenient examples, for it is apparent that any other special tools, including taps, drills, or the like, may be mounted in suitable apertures in the turret disk 447.

The block 443 is provided with a ball 457 (Fig. 34) pressed against the left face of the turret disk 447 by a spring 459. The turret disk, in turn, is provided with a series of cavities or depressions 461 alined with the ball 457 when various special tools carried by the turret disk are properly alined with the axis of the work piece, or when the aperture 451 is thus alined. The ball and the cavities thus form resilient detent means for holding the turret disk 447 in any selected one of its operating positions. To make the structure more rigid and prevent any undesired movement of the turret disk 447 in a direction axially of the work piece, the forward edge of the turret edge is received in a groove or slot in the block 391, as seen in Fig. 34. Stop pins 463 and 465 on the turret disk 447 engage the block 443 when the disk is turned to its extreme position in one direction or the other, to assist (along with the spring-pressed detent) in properly alining the disk with the work.

A second turret disk, which may also be used for drills, taps, or other special tools, but which is intended primarily for use with abutments or stops to control the longitudinal feeding movements of the work, is shown at 471 (Figs. 20, 21, 26, and 30) and is adjustable to any desired position along its shaft 473 (parallel to the rotary axis of the work piece) by loosening the clamping screw 475 (Fig. 30) which clamps the disk firmly at any desired point on the shaft 473. This shaft, in turn, is rotatably mounted on the block 391 and is provided with a series of cavities 477 (Fig. 28) selectively alinable with the spring pressed ball 479 in the block 391, to hold the shaft 473 in any desired position of rotary adjustment.

When the shaft 473 is turned to one or another of its positions of rotary adjustment, one or another of the apertures 481 (Fig. 30) in the turret disk 471 are brought into axial alinement with the work. As above indicated, any of these apertures 481 may be provided with special tools such as drills, taps, etc., for operating upon the advancing end of the work, or may be provided preferably with abutment rods 483 of various lengths as seen in Fig. 21. The special tools or other rods are clamped in the apertures 481 by clamp screws 485, so that the abutment rods are longitudinally adjustable for coarse adjustment, relative to the disk 471. For fine adjustment, the left end of each abutment rod 483 is provided with an adjusting screw 486 and a lock nut 487. The series of rods 483 provide an efficient and convenient way of controlling the longitudinal feeding movements of the work through the apparatus, since the work may be fed rightly through the apparatus until the advancing end of the work comes into contact with the proper selected one of the adjusting screws 486 on the rod 483 previously brought into alinement with the work by rotation of the disk 471 and shaft 473 to the proper position.

If the work piece W is to be turned down to a given diameter throughout a substantial axial length, then preferably when the lever 373 has been operated to bring the lip 383 against the appropriate radial stop pin 395 determining the diameter of the work at this point, the slide 361 is firmly clamped in this position by tightening the clamping screw 367, which extends upward to a conveniently accessible handle. Then, the tool now being clamped in position for a fixed diameter, the work piece is fed rightwardly through the required distance, preferably until it comes into contact with an appropriate one of the longitudinal stops 483 previously set for this purpose.

While rightward movement of the work piece relative to the apparatus has been mentioned, yet it will be readily apparent that merely a relative longitudinal feeding movement between the work piece and the apparatus is meant. Actually, in most cases, this relative movement is secured by feeding the tool rest 327 and the apparatus mounted thereon leftwardly along the bed of the lathe, rather than by feeding the work piece rightwardly.

In the second form of the invention, the notched disks or members 417 and 427 may, like the members 91 and 111 of the first form of the invention, be made or lined with carboloy or other metal which is harder than the metal of the work piece, if a burnishing and sizing action on the work piece is desired, as described in connection with the first form of the invention. However, if such a burnishing and sizing operation is not desired, the members having the guiding notches in them need not be made so hard. In the second embodiment of the invention, burnishing would occur only in a lengthwise direction in any event, because the members 417 and 427 rotate with the work or stock, instead of being stationary.

The coolant delivered through the duct 433 in the second embodiment of the invention, may be refrigerated, if desired, just as in the case of the coolant delivered through the duct 211 of the first embodiment of the invention.

It is noted that both embodiments of the invention preferably include a member which is elongated in a direction approximately parallel to the rotary axis of the work or stock, being the member 65 of the first embodiment of the invention and the member 473 of the second embodiment of the invention. Also it is noted that in both of these embodiments, the elongated member may be described as a cantilever member, since it is supported only at its left end and projects like a bracket or cantilever from the supported left end to the unsupported right end.

Moreover, it is to be noted that both forms of the apparatus are carried by the tool slide or similar part of a conventional lathe, and need no other support. It is a simple matter to mount either form of the invention on any conventional engine lathe, or to remove it therefrom. As already indicated, the accuracy or lack of accuracy of the conventional lathe on which the present apparatus is mounted, is comparatively unimportant in producing accurate work with the present invention. Even a considerable amount of looseness or play in the tool slide or the spindle or the feeding gears or other parts of the conventional lathe, will have no effect on the accuracy, either in a diametrical direction or in an axial direction, of the work produced by either embodiment of the present invention. Both embodiments of the invention are well adapted for efficient and speedy mass production, in quantity, of relatively long and slender work of the kind for which this apparatus is intended.

A slight modification of the second embodiment of the invention is illustrated in Fig. 40, to which reference is now made. In this modification, the member 405 (corresponding to the member of the same number in Figs. 26 and 27) is provided as before with a suitable ball bearing, here indicated at 491. As before, this ball bearing is of a diameter somewhat larger than the largest diameter of the stock which is to be operated upon by the machine. Fitting snugly but replaceably in the ball bearing 491 is a tubular adapter 493, the right hand end of which is internally slightly tapered to cooperate with the externally tapered right hand end of a split collet 495, which may be essentially of the conventional collet construction customarily used with lathes. A set screw 497 extending radially through the wall of the adapter 493 has a cylindrical inner end which engages in a longitudinal groove or keyway 499 formed in the outer surface of the collet 495, so that the set screw prevents the collet from turning in the adapter 493, but permits longitudinal movement thereof.

The left end of the collet is externally threaded to engage a knurled nut 501 which bears against the left end of the adapter 493 and which, when tightened on the threads of the collet, will draw the collet leftwardly and thus reduce the diameter of the split right hand end of the collet. Thus the internal diameter of the right hand end of the collet may be easily and quickly adjusted so as to fit precisely the external diameter of the work piece or stock, thus eliminating even the slight possibility of lateral movement between the work and the bearing which might occur (although to an almost negligible extent) with the construction shown in Figs. 26 and 27. The construction of Figs. 26 and 27 is quite satisfactory for turning the diameter of the work to a quite high degree of accuracy, but when an even greater degree of accuracy is required, then the modified construction of Fig. 40 may be used.

By employing collets of different diameters in the same adapter 493, and by substituting, when necessary, different adapters 493 in the bearing 491, to accomodate a still greater range of sizes of collets, it is possible to accomodate a large range of diameters of work pieces and yet in each instance to hold the work piece against any possibility of lateral play in the ball bearing 491, while yet permitting it to make the necessary longitudinal movements through the ball bearing, as the turning process proceeds in an axial direction. When the collet has been adjusted to exactly the right bearing pressure on the exterior surface of the work, by turning the knurled hand nut 501, the latter may be held in adjusted position by tightening the set screw 503 arranged radially in the nut 501. It will be noted that the set screws 497 and 503 are of the recessed head type, and do not project outwardly beyond the surface of the members in which they are mounted, so that the rapid rotation of the members 493 and 501, after the parts have been adjusted, does not present any hazard due to projecting set screws.

In this modified arrangement, just as in the previously described bearing arrangeent of Figs. 26 and 27, the pawl 421 may be attached to the adapter 493 to insure rotation of the adapter and the ball bearing with the work stock, if so desired. It is usually not necessary, however, because the split collet 495 may be adjusted to bear tightly enough on the work piece to insure rotation of the collet with the work piece, without causing undue friction resisting the necessary longitudinal movement of the work piece through the collet.

It is seen that all of the above disclosed forms of the present invention involve a novel method or process for turning slender work, which method or process comprises the steps of holding the stock or work piece axially immovable in the conventional headstock of the lathe while rotating it by the rotary force of the headstock, and at the same time applying both a cutting tool and a guiding bearing to the stock or work piece in very close proximity to each other but at a substantial distance from the headstock of the lathe, and moving the cutting tool and the guiding bearing axially toward the headstock in axially fixed relation to each other, as the turning operation proceeds. Of course, the diametrical relation between the cutting tool and the guiding bearing may be altered from place to place along the length of the stock, in order to turn different parts of the stock to different diameters, but the close axial spacing or relation between the guiding bearing and the cutting tool remains substantially constant as the guiding bearing and the cutting tool together move in unison toward the headstock of the lathe, subject perhaps to tiny variation if it is found necessary to readjust the internal diameter of the split collet 495 during the progress of the turning operation. The concurrent movement of the tool and the guiding bearing toward the headstock of the lathe is accomplished, of course, by feeding the lathe carriage leftwardly toward the headstock, since the mechanism of the present invention is mounted on the carriage or on the usual tool slide supported in turn from the carriage.

For turning pieces of work not longer than the maximum movement of the carriage along the bed of the lathe, a single movement of the carriage from the right end to the left end of the bed of the lathe will be sufficient for turning to the proper diameters the entire length of the work piece. For longer work pieces, however, the carriage may be traversed leftwardly as already indicated until it comes substantially up against the headstock of the lathe; then the headstock collet may be loosened and the work piece may be fed rightwardly through the lathe spindle, while at the same time the carriage is moved rightwardly simultaneously with the rightward movement of the work piece, no cutting occurring during this movement. When the carriage reaches the right hand end of the bed of the lathe, the axial movement of the stock is stopped and the stock is axially fixed in the lathe spindle by tightening the headstock collet or chuck, and the cutting operation is then resumed, moving the lathe carriage and the cutting tool and the supporting bearing leftwardly toward the headstock while the work piece is rotating but is axially fixed. In this way different sections of the same work piece may be successively cut, and if necessary there may be produced a work piece having a length several times the length of the bed of the lathe. It is thus seen that this novel method or process produces results which are impossible of attainment when using a conventional lathe in the conventional manner.

In using the present invention for producing work pieces quite long relative to the length of the bed of the lathe, the conventional tailstock is usually removed from the lathe, or at least the tailstock spindle may be removed and the work may be allowed to project rightwardly through the spindle hole of the tailstock.

What is claimed is:

1. Slender work turning apparatus to be mounted on a tool slide of a lathe and to move bodily with said tool slide, said apparatus including a member for resting on said tool slide and extending upwardly therefrom, a fastening element secured to said member and extending downwardly therefrom to enter said tool slide to fasten said member to said tool slide, said member having an opening for passage therethrough of the work to be turned, a bearing carrier secured to said member, a rotary bearing mounted on said carrier for contacting with and supporting a work piece extending through said opening, means forming a guideway on said member in a direction approximately perpendicular to said work piece, a slide mounted for movement in said guideway, means for holding a plurality of cutting tools on said slide in such position that one or another of said cutting tools may be brought to bear one at a time against the work, by moving said slide to one position or another, a tool turret mounted on said member for pivotal movement to bring any one of a plurality of selected positions of said turret into alinement with said work piece, a stop support mounted on and supported from said member and extending in a general direction parallel to said work piece, and a stop turret rotatably mounted on said stop support and carrying a plurality of stops, any selected one of which may be brought into alinement with said work piece by turning said stop turret on said stop support.

2. A construction as defined in claim 1, further including a second stop turret mounted on said member for rotation about an axis substantially perpendicular to the axis of said work piece, and a plurality of stops carried by said second stop turret and selectively positionable, by rotation of said second stop turret, into cooperative relation to said tool holding slide to limit motion of said slide in at least one direction.

3. A construction as defined in claim 1 in which said slide has a lip overlapping a portion of said member, and further including a gauge turret mounted for rotary movement about an axis substantially perpendicular to the work, and a plurality of gauge pins of different sizes mounted radially on said gauge turret and projecting therefrom in position so that upon turning said gauge turret, any selected one of said pins may be interposed between said lip of said slide and the part of said member which is overlapped by said lip.

MAXWELL R. KARGE.

References Cited in the file of this patent

UNITED STATES PATENTS

| Number | Name | Date |
|---|---|---|
| 377,080 | Lindner | Jan. 31, 1888 |
| 452,495 | Lindner | May 19, 1891 |
| 457,967 | Hartness | Aug. 18, 1891 |
| 602,965 | Walker | Apr. 26, 1898 |
| 1,000,011 | Johnson et al. | Aug. 8, 1911 |
| 1,050,828 | Hendrickson | Jan. 21, 1913 |
| 1,228,570 | Kupp | June 5, 1917 |
| 1,695,359 | Beth | Dec. 18, 1928 |
| 2,012,826 | Montgomery | Aug. 27, 1935 |

FOREIGN PATENTS

| Number | Country | Date |
|---|---|---|
| 551,885 | Great Britain | Mar. 15, 1943 |